United States Patent [19]

Fawcett, Jr. et al.

[11] Patent Number: 5,775,358
[45] Date of Patent: Jul. 7, 1998

[54] INDICATOR FOR COMPRESSED GAS CARTRIDGE

[75] Inventors: Lyman W. Fawcett, Jr., St. Petersburg; Jacek M. Weinheimer, Treasure Island, both of Fla.

[73] Assignee: Halkey-Roberts Corporation, St. Petersburg, Fla.

[21] Appl. No.: 552,737

[22] Filed: Nov. 3, 1995

[51] Int. Cl.⁶ ..................................... F16K 37/00
[52] U.S. Cl. .................. 137/68.18; 137/227; 137/557; 137/559; 116/272; 222/23
[58] Field of Search ................ 137/68.18, 227, 137/557, 559; 116/272; 222/5, 23

[56] References Cited

U.S. PATENT DOCUMENTS

| | | | |
|---|---|---|---|
| 2,263,840 | 11/1941 | Franck | 116/272 |
| 2,563,968 | 8/1951 | Simmons | 137/227 |
| 3,074,457 | 1/1963 | Tubbs | 137/227 X |
| 3,203,246 | 8/1965 | Horwitt et al. | 116/272 X |
| 3,675,722 | 7/1972 | Balmes, Sr. | 222/23 X |
| 4,927,057 | 5/1990 | Janko et al. | 222/23 X |
| 4,986,128 | 1/1991 | Burns | 116/272 X |
| 5,014,786 | 5/1991 | Kobayashi | 116/272 |
| 5,413,247 | 5/1995 | Glasa | 222/23 X |
| 5,597,091 | 1/1997 | Mah et al. | 222/23 X |

*Primary Examiner*—John Rivell
*Attorney, Agent, or Firm*—Trexler, Bushnell, Giangiorgi & Blackstone, Ltd.

[57] ABSTRACT

Disclosed is an indicator system for use with inflating devices that use a cylinder of compressed gas. The indicator system is comprised of a cylinder adapter which receives and supports a cylinder and, concurrently, is received by an inflating device. The cylinder adapter includes an indication means that signals whether the attached cylinder is full or has been discharged by way of the indication means being responsive to the high pressure release from the cylinder during a discharge. The indication means incorporates the use of the color green to signify that the cylinder is full and the color red to signify that the cylinder has been discharged. The indicator system is designed to have a one-time use after which it is disposed of.

20 Claims, 6 Drawing Sheets

INDICATOR FOR COMPRESSED GAS CARTRIDGE

FIELD OF THE INVENTION

This invention relates to an indicator system and, more particularly, to a cylinder indicator system for use with inflating devices that utilize a cylinder of compressed gas.

DESCRIPTION OF THE BACKGROUND ART

Presently, many types of inflating devices are known and are in wide use today throughout the inflator industry that utilize a cylinder of compressed gas. One such application is for inflating life preserver systems. However, a common complaint with these systems is that an inflation system with an empty cylinder is indistinguishable from a system with a viable cylinder. Presently, the status of an inflation system can only be checked by unscrewing the cylinder from the system and visually inspecting the sealed end. Thus, in the current systems marketed today, a user cannot determine if the cylinder is a viable cylinder or an empty cylinder unless the cylinder is detached and closely inspected.

One of the problems with the automatic inflators constructed and currently available is that users have the ability to attach cylinders without regard to the cylinders being empty or viable. This problem renders autoinflators less dependable in general due to not being able to determine the status of an attached cylinder from a quick glance at the overall device. Thus, the lack of any type of cylinder indicator system being offered on current inflation devices presents an inadequacy which must be overcome.

One approach would be to use a chemical color change that would be sensitive to the gas in the cylinder. However, this approach is not feasible due to the color change being only temporary or faint.

An approach which utilizes the high pressure aspect of the compressed gas in the cylinder being tapped off upon its release was decided upon. This approach is feasible and could be made at relatively low costs. Thus, an indicator system which is responsive to the high pressure release of compressed gas upon its discharge from a cylinder is the approach chosen for overcoming the inadequacies in the prior art inflators.

Therefore, it is an object of this invention to provide an improvement which overcomes the aforementioned inadequacies of the prior art devices and provides an improvement which is a significant contribution to the advancement of the inflation art.

Another object of this invention is to provide an indicator system that tells if the cylinder is full without requiring the cylinder to be detached and inspected.

Another object of this invention is to provide an indicator system to be incorporated with current inflator systems that cannot be tampered with by the user after assembly. Thus, the indicator system cannot be separated from the cylinder and thereby attached to empty cylinders.

Another object of this invention is to provide an indicator system that cannot be reset thereby alleviating any possibilities of a discharged system being altered to indicate that the system is full.

Another object of this invention is to provide an indicator system that clearly indicates the correct status of the attached cylinder.

Another object of this invention is to provide an indicator system that is reliable in that only a few parts are required and little movement is involved wherein breakages and defaults would rarely occur. Thus, the indicator system has a extremely low risk of failure.

Another object of this invention is to provide an indicator system that is inexpensive and easy to manufacture thereby allowing the construction of one-time use disposable systems.

Another object of this invention is to provide a cylinder indicator system for use with inflating devices that include a cylinder of compressed gas having a slim neck, a full body and an outer surface, the cylinder indicator system comprising in combination: an adaptor means for receiving the cylinder and facilitating coupling the cylinder to the inflation device; an indication means for indicating the respective status of the cylinder as being full or empty coupled to the adaptor means; and a gas flow means for providing a secondary supply of gas to the indication means, the gas flow means being coupled to the adaptor means and in fluid communication with the indication means, whereby the indication means is responsive to a secondary flow of gas guided thereat upon the discharging of the cylinder into an inflatable device.

The foregoing has outlined some of the pertinent objects of the invention. These objects should be merely illustrative of some of the more prominent features and applications of the intended invention. Many other beneficial results can be attained by applying the disclosed invention in a different manner or modifying the invention within the scope of the disclosure. Accordingly, other objects and a more comprehensive understanding of the invention may be obtained by referring to the summary of the invention, and the detailed description of the preferred embodiment in addition to the scope of the invention defined by the claims taken in conjunction with the accompanying drawings.

SUMMARY OF THE INVENTION

The invention is defined by the appended claims with the specific embodiment shown in the attached drawings. For the purpose of summarizing the invention, the invention is comprised of a cylinder adaptor having a neck portion and a body portion. The neck portion is sized to receive the slim neck of a cylinder as well as itself being received by an inflating device. The body portion is sized to receive and support the body of a cylinder as well as support the indication means.

One embodiment of the indication means is comprised of the cylinder adaptor in combination with an indicator sleeve formed from transparent material which facilitates the viewing of indicator paper supported within the body portion. The indicator sleeve serves to enclose the indicator paper within the body portion and thereby serve to retain dye fluid which contacts the indicator paper upon the discharge of a cylinder. The indicator sleeve is formed from a transparent material to facilitate the viewing therethrough of the dye fluid so to indicate the status of the cylinder.

In an alternate embodiment encompassed by the present invention, the cylinder adaptor is combined with a slide sleeve and an indicator shield. The slide sleeve is sized to receive the cylinder adaptor therethrough and cooperate with a first and second indicator channel so to indicate the status of the cylinder. The slide sleeve functions to expose one of the first and second indicator channels according to the status of the cylinder. Initially, the slide sleeve is exposing the green-colored first indicator channel so to signify that the cylinder is full. Subsequently, upon the cylinder being discharged, the slide sleeve is forced to move along the cylinder adaptor thereby covering the green-colored first indicator channel and exposing the red-colored second indicator channel. The exposed red-colored second indicator channel serves to signify that the cylinder has been discharged.

Additionally, the indicator shield is sized to receive the cylinder adaptor and slide sleeve therein so to provide a form of protection from the slide sleeve movement. The indicator shield is formed from a transparent material to facilitate the viewing of the first and second indicator channels therethrough.

Both of the embodiments of the present invention utilize the release of high pressure compressed gas from within the cylinder to activate the indication means so to report the respective status of the cylinder.

An important feature of the present invention is that the indicator system is designed to report to the user the status of the attached cylinder thereby giving notice when the cylinder is no longer usable. Thus, it is no longer required to detach the cylinder and inspect it to determine whether the cylinder has been discharged.

Another important feature of the present invention is that the indicator system and associated cylinder are sold as a throw-away unit which cannot be separated so to allow for a new cylinder to be inserted in an old system. Thus, the indicator system of the present invention serves to preclude any tampering conducted by the user which resultingly thereby increases the reliability and eliminates the possibility of an empty cylinder being placed in an indicator system that is reporting a full status.

Another important feature of the present invention is that the indicator system cannot be reset once the cylinder has been discharged.

Another important feature of the present invention is that the indicator system exhibits a clear indication of the correct status of the attached cylinder. Thus, the status of the cylinder is easily determinable at a quick glance.

Therefore, it can be readily appreciated that the present invention precludes the attempted use of an inflating device that has a discharge cylinder in that the indicator system will clearly indicate to the user the status of the cylinder as being discharged. In addition, the indicator system will also clearly indicate the status of the cylinder as being full prior to being discharged.

The foregoing has outlined rather broadly, the more pertinent and important features of the present invention. The detailed description of the invention that follows is offered so that the present contribution to the art can be more fully appreciated. Additional features of the invention will be described hereinafter. These form the subject of the claims of the invention. It should be appreciated by those skilled in the art that the conception and the disclosed specific embodiment may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more succinct understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
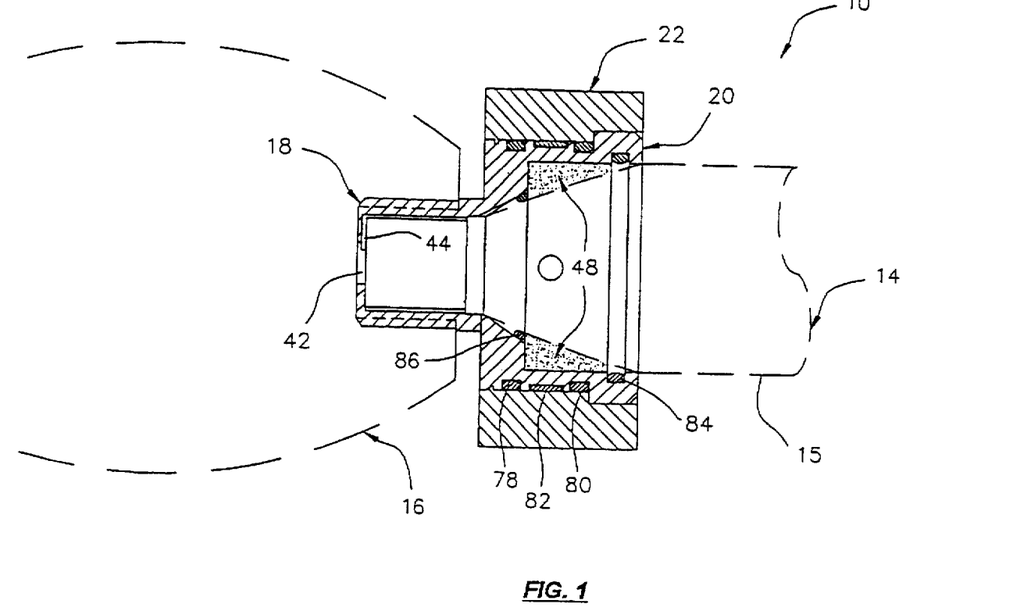
FIG. 1 is a cross-sectional assembly view of the cylinder adaptor, indicator sleeve, first sleeve gasket, second sleeve gasket, first cylinder gasket, and second cylinder gasket in their relative positions to each other in combination with an inflator device and cylinder shown in phantom.

As shown in FIG. 1, the cylinder indicator system 10 can be seen in a cross-sectional assembly view wherein the cylinder adaptor 12 is shown receiving and supporting a cylinder 14 having an outer surface 15 and, concurrently, being received by an inflating device 16. The cylinder 14 and the inflating device 16 are shown in phantom to illustrate the proper alignment and positioning of the cylinder adaptor 12. Further, the cylinder adaptor 12 can be seen to have a neck portion 18 and a body portion 20. Around the body portion 20 is positioned an indicator sleeve 22 which is releasably coupled to the body portion 20. The indicator sleeve 22 is preferably coupled to the body portion 20 by way of a snap-fit configuration.

Figure 2:
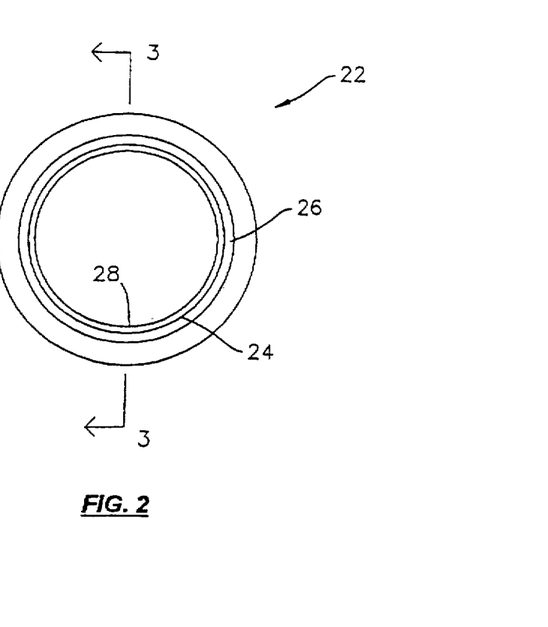
FIG. 2 is a side elevational view of the indicator sleeve showing the center bore, stepped bore portion and the internal snap-fit ridge in their relative positions to each other.
Figure 3:
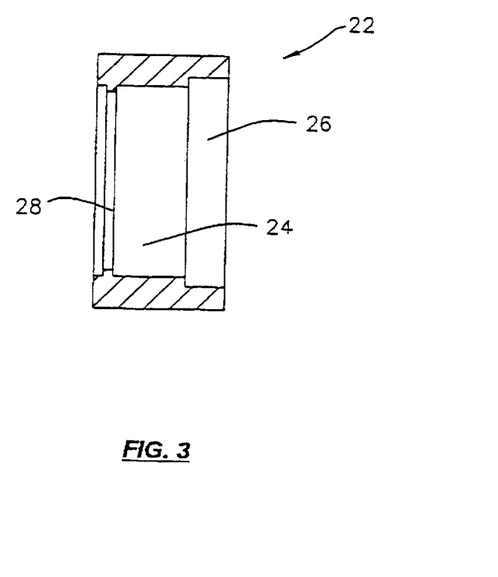
FIG. 3 is a cross-sectional view taken along line 3—3 as depicted in FIG. 2 of the indicator sleeve showing the relative positioning of the internal snap-fit ridge, the center bore and the stepped bore portion.

In now referring to FIG. 2, the indicator sleeve 22 can be seen in more detail. The indicator sleeve 22 is circular in shape having a central bore 24, a stepped bore portion 26 and an internal snap-fit ridge 28. The internal snap-fit ridge 28 protrudes radially inward from the central bore 24 and facilitates releasably securing the indicator sleeve 22 to the body portion 20. The stepped bore portion 26 is slightly larger in diameter than the central bore 24 in that it is sized to cooperate with the body portion 20 of the cylinder adaptor 12. To further illustrate the construction of the indicator sleeve 22, refer now to FIG. 3 which illustrates a cross-sectional view of the indicator sleeve 22 taken along line 3—3 as depicted in FIG. 2. The internal snap-fit ridge 28 can be seen more clearly to protrude radially inward from the central bore 24 and the stepped bore portion 26 is distinctively seen opposite the internal snap-fit ridge 28.

Figure 4:
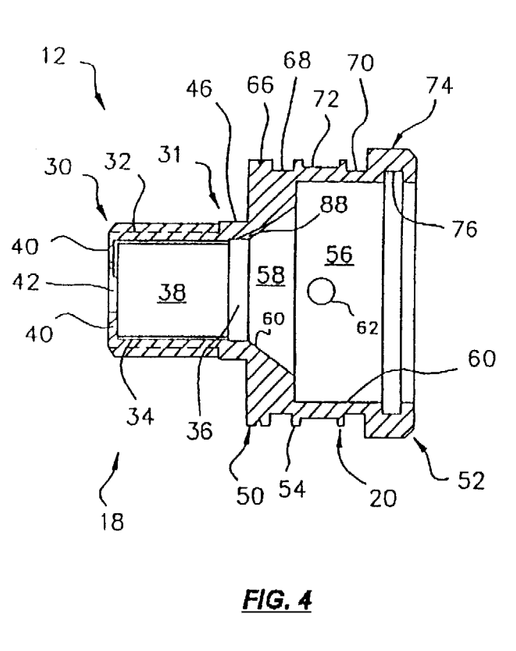
FIG. 4 is a cross-sectional view of the cylinder adaptor illustrating the various parts of the respective neck and body portions in their relative positions to each other.

In now referring to FIG. 4, the cylinder adaptor 12 can be seen in an isolated cross-sectional view illustrating the individual parts incorporated therewith. The cylinder adaptor 12 can be seen to have the neck portion 18 coupled to the body portion 20. The neck portion 18 has a distal end 30 and a proximal end 31. External threads 32 are positioned on the neck portion 18 to facilitate releasably coupling the cylinder indicator system 10 to an inflating device 16. To facilitate releasably coupling a cylinder 14 to the cylinder adaptor 12, the neck portion 18 further includes internal threads 34. In coupling a cylinder 14 to the cylinder adaptor 12, it is preferable to bond the cylinder 14 to the cylinder adaptor 12 after threaded engagement by way of glue so to preclude detachment from one another thereafter. By precluding detachment after assembling the cylinder adaptor 12 with a cylinder 14, the attaching of a used cylinder 14 to a cylinder adaptor 12 exhibiting a full status would be precluded.

The neck portion 18 has an enlarged stepped bore 36 adjacent the proximal end 31 and extends to converge with a center bore 38 which continues to the distal end 30. The center bore 38 terminates with an inturned flange 40 positioned at the distal end 30. The inturned flange 40 extends radially inward to form a center hole 42. The center hole 42 serves to allow the compressed gas contained within the cylinder 14 to pass therethrough into the inflating device 16.

Additionally, positioned in and running along the internal threads 34 is a gas flow channel 44 which serves to provide a secondary supply of gas, tapped off from the main discharge of the cylinder 14, to the indication means. When threadingly engaging the cylinder adaptor 12 to the inflating device 16, the neck portion 18 includes an external step portion 46 that serves to establish a maximum point of insertion into the inflating device 16. Thus, threaded engagement with the inflating device 16 extends only up to the external step portion 46.

Figure 5:
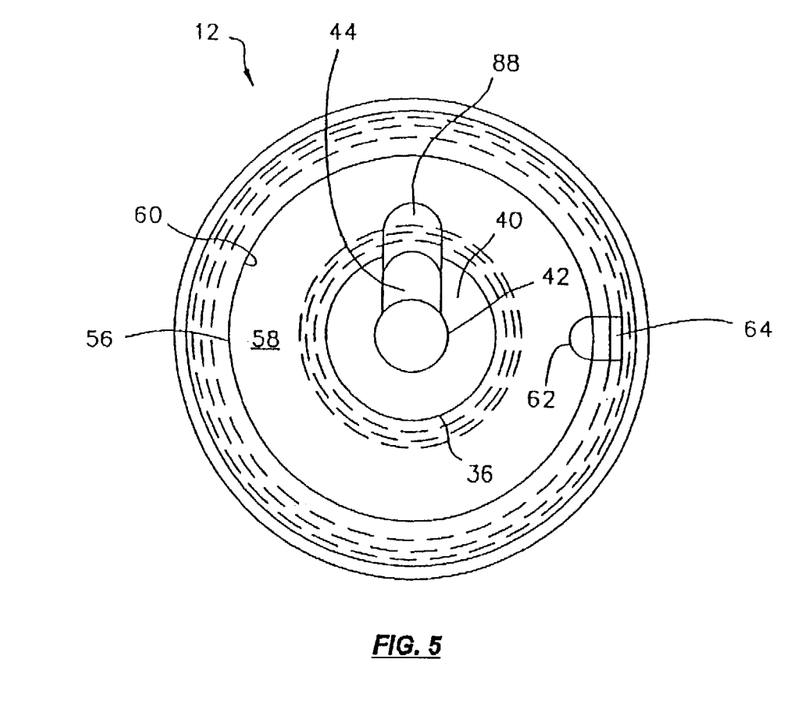
FIG. 5 is a side elevational view of the cylinder adaptor looking into the body portion wherein the center hole of the neck portion, the gas flow channel, the tapered center bore and the vent hole can be seen in their relative positions to each other.

In referring now to FIG. 5, the cylinder adaptor 12 can be seen in a side elevational view looking into the body portion 20 wherein the gas flow channel 44, inturned flange 40, enlarged stepped bore 36 and center hole 42 can be better seen. The gas flow channel 44 extends the length of the neck portion 18 to the enlarged stepped bore 36. The secondary supply of gas flowing from the gas flow channel 44 and enlarged stepped bore 36 continues through a valve means to a dye chamber 48 (see FIG. 1).

In now referring back to FIG. 4, the body portion 20 can be explained in further detail. The body portion 20 has a first end 50, a second end 52 and an outside surface 54. Incorporated within, the body portion 20 includes a large bore section 56 that extends partially through the body portion 20 from the second end 52. The large bore section 56 is sized to receive the full body of the cylinder 14. The large bore section 56 joins with a tapered bore section 58 having a smaller diameter. The tapered bore section 58 extends from the large bore section 56 toward the first end 50 of the body portion 20. The tapered bore section 58 has a decreasing diameter as it progresses from the large bore section 56 to the first end 50. The large bore section 56 and the tapered bore section 58 have internal surfaces 60 which cooperate relative to the outer surface 15 of the cylinder 14.

The body portion 20 includes a vent hole 62 as seen in FIGS. 1, 4 and 5. In specifically referring to FIG. 5, a vent plug 64 can be seen in position in the vent hole 62. The vent plug 64 facilitates enclosing and retaining dye fluid within the dye chamber 48 prior to a discharge of the cylinder 14.

In now examining the outside surface 54 of the body portion 20 as illustrated in FIG. 4, a snap-fit groove 66 is positioned adjacent the first end 50 and is sized to receive the internal snap-fit ridge 28 which protrudes radially inward from the central bore 24 of the indicator sleeve 22. Next, a first gasket groove 68, a second gasket groove 70 and an indicator chamber 72 positioned therebetween are aligned on the outside surface 54 of the body portion 20. Adjacent the second end 52 of the body portion 20 is an external end flange 74 extending radially outward. The snap-fit groove 66, first gasket groove 68, second gasket groove 70, indicator chamber 72 and external end flange 74 are all integral with and positioned on the outside surface 54 of the body portion 20. Further, as depicted in FIG. 4, the large bore section 56 adjacent the second end 52 includes a cylinder gasket groove 76 which is integral with and extending radially outward from the internal surface 60 of the large bore section 56.

To provide airtight seals for the indicator chamber 72, a first sleeve gasket 78 is seated within the first gasket groove 68 and a second sleeve gasket 80 is seated within the second gasket groove 70 on the outside surface 54 of the body portion 20. The first and second sleeve gaskets 78 and 80 are sized to be compressed slightly when the indicator sleeve 22 is placed in position on the body portion 20. Thus, the indicator chamber 72 is completely enclosed via the outside surface 54 of the body portion 20, the indicator sleeve 22 and the first and second sleeve gaskets 78 and 80.

Additionally, placed within the indicator chamber 72 is an indicator paper 82 which is to be contacted by dye fluid contained in the dye chamber 48 which passes through the vent hole 62 upon the vent plug 64 being forced open by a supply of pressurized gas flowing therethrough during a discharge of the cylinder 14. The dye fluid contacting the indicator paper 82 will result in displaying a color to signify that the cylinder 14 has been discharged.

The dye chamber 48 is defined by the internal surfaces 60 of the large bore section 56 and tapered bore section 58, the first cylinder gasket 84, the second cylinder gasket 86 and the outer surface 15 of the cylinder 14. The first cylinder gasket 84 is seated within the cylinder gasket groove 76 adjacent the second end 52 of the body portion 20. The first cylinder gasket 84 is sized to be slightly compressed upon the insertion of the full body of the cylinder 14. The second cylinder gasket 86 is positioned against the internal surface 60 of the tapered bore section 58 so as to be slightly compressed when contacted by the outer surface 15 of the cylinder 14 upon being inserted within the cylinder adaptor 12. The second cylinder gasket 86 contacts the outer surface 15 of the slim neck of the cylinder 14. The first and second cylinder gaskets 84 and 86 serve to provide airtight seals thereby sealing the dye chamber 48.

Further, the second cylinder gasket 86 functions as a valve means to thereby allow the secondary supply of gas, tapped-off from the main compressed gas supply, to flow into the dye chamber 48 while concurrently allowing a flow of gas out of the dye chamber 48 in the event of an over-pressurization of the dye and indicator chambers 48 and 72. Thus, the second cylinder gasket 86 functions as a two-way valve. The internal surface 60 of the tapered bore section 58 and the outer surface 15 of the slim neck of the cylinder 14 align in such a manner as to be relatively parallel to each other. This allows the second cylinder gasket 86 to flex toward either the first end 50 or the second end 52 of the body portion 20 when experiencing a flow of gas exerting a force thereon during discharge or an over-pressurization of the dye and indicator chambers 48 and 72.

To facilitate the release of pressure upon an over-pressurization, a slot 88 is positioned in the tapered bore section 58 which runs along the tapered bore section 58 to the enlarged stepped bore 36 in alignment with the gas flow channel 44. The slot 88 serves to provide an escape path for gas to flow along that has been released by the second cylinder gasket 86 out of the dye chamber 48. When an over-pressurization occurs in the dye chamber 48, the second cylinder gasket 86 is forced to move, along the tapered bore section 58, slightly towards the first end 50 of the body portion 20. Upon moving towards the first end 50, the second cylinder gasket 86 exposes the slot 88 to the dye chamber 48 and thereby facilitates the release of gas therefrom until the pressure is sufficiently decreased and the second cylinder gasket 86 returns to its original position closing off the slot 88.

In now referring to FIG. 1, the operation of the cylinder indicator system 10 can be better understood. Upon an activation of the inflating device 16, the cylinder 14 discharges its load of compressed gas. As the compressed gas exits the cylinder 14 and passes through the center hole 42 located in the inturned flange 40 of the neck portion 18, a secondary supply of gas is tapped-off and diverted by way of the gas flow channel 44 which directs a secondary supply of gas toward the enlarged stepped bore 36 to the slot 88 and out into the tapered bore section 58 of the body portion 20.

Next, the secondary supply of gas passes through the valve means, comprised of the second cylinder gasket 86, to thereby pressurize the dye chamber 48. The dye chamber 48, having been initially filled with a dye fluid during assembly, subsequently becomes pressurized to a point where the vent plug 64 is forced open whereupon the dye fluid is forced out the vent hole 62 into the indicator chamber 72 and into contact with the indicator paper 82. When the dye fluid contacts the indicator paper 82, a color is resultingly exhibited signifying that the cylinder 14 has been discharged. The indicator sleeve 22, which encloses and seals the indictor chamber 72 is transparent in nature and facilitates the viewing of the signaling color.

In this embodiment, it is preferable that the signaling color be red so as to be easily noticeable and alarming. Once the cylinder 14 has been discharged and the dye fluid has been released from the dye chamber 48 into the indicator chamber 72, the cylinder adaptor 12 and associated cylinder 14 are to be threadably disengaged from the inflating device 16 and promptly disposed of.

Figure 6:
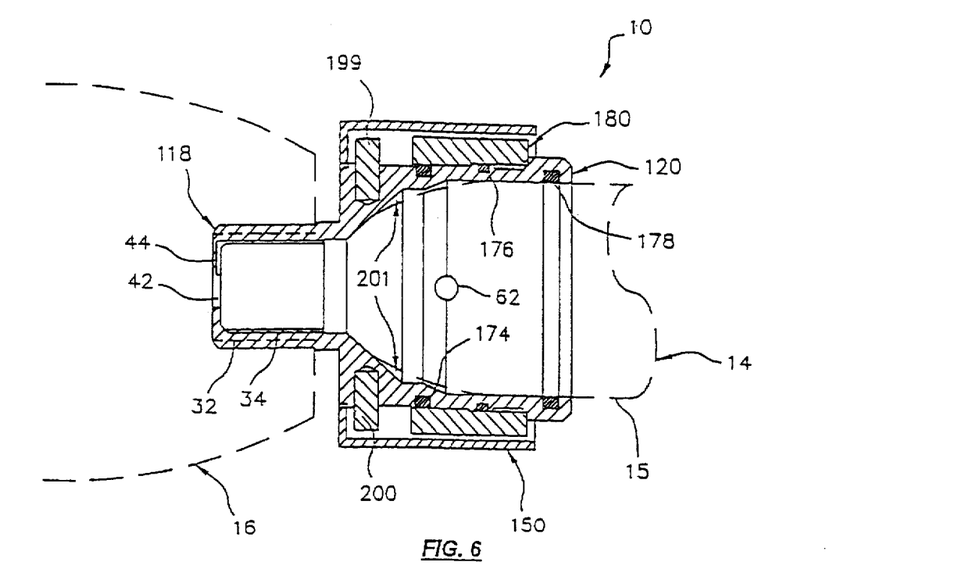
FIG. 6 is a cross-sectional assembly view of an alternate embodiment of the cylinder adaptor illustrating the relative positions of the neck and body portions, the slide sleeve, the large external gasket, the small external gasket, the large internal gasket, the first and second reams and their respective first and second pins and the indicator shield snap-fit in place in their relative positions to each other along with an inflator device and cylinder shown in phantom.
Figure 7:
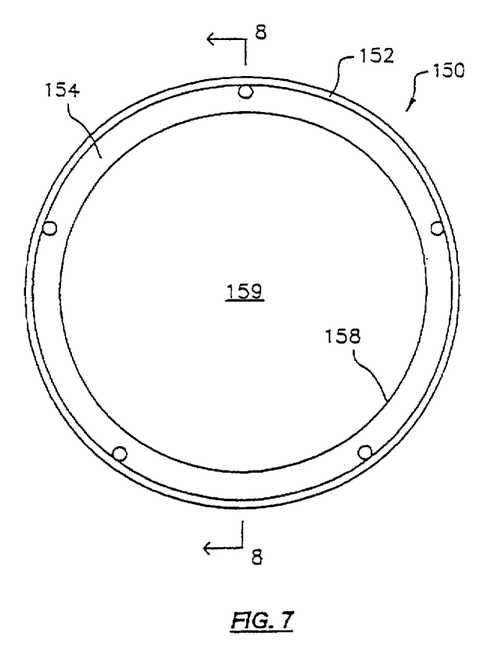
FIG. 7 is a side elevational view of the indicator sleeve illustrating the relative positions of the center hole, the inturned radial flange and the internal edge in their relative positions to each other.
Figure 8:
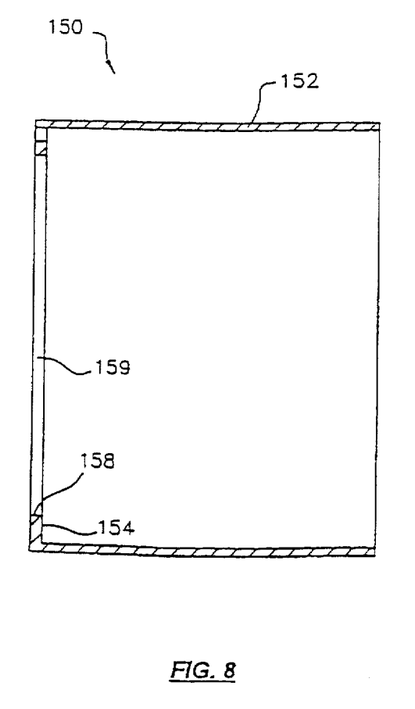
FIG. 8 is a cross-sectional side view of the indicator sleeve taken along line 8—8 as depicted in FIG. 7 illustrating the center hole and inturned radial flange in their relative positions to each other.

In now referring to FIG. 6, a cross-sectional view of an alternate embodiment of the cylinder indicator system 10 can be seen. FIG. 6 illustrates a cylinder adaptor 100 very similar to the cylinder adaptor 12 utilized in the first embodiment. The cylinder adaptor 100 is also comprised of a neck portion 118 and a body portion 120. The neck portion 118 incorporates all of the features of the first embodiment. A shield snap-fit groove 122 is positioned adjacent the first end 156 of the body portion 120. The shield snap-fit groove 122 serves to secure an indicator shield 150 to the body portion 120. The indicator shield 150 is circular in shape having an internal diameter sized to receive the cylinder adaptor 100 therein. The indicator shield 150 is formed from an integral wall 152 which extends along the longitudinal axis of the cylinder adaptor 100. The integral wall 152 has an inturned radial flange 154 that extends radially inward adjacent a first end 156 of the body portion 120. The inturned radial flange 154 has an internal edge 158 which defines a center hole 159. The center hole 159 is sized such that the internal edge 158 is forcibly received within the shield snap-fit groove 122 (see FIGS. 6, 7 and 8). It is preferable that the indicator shield 150 be formed from a clear polycarbonate material to facilitate viewing therethrough.

Figure 9:
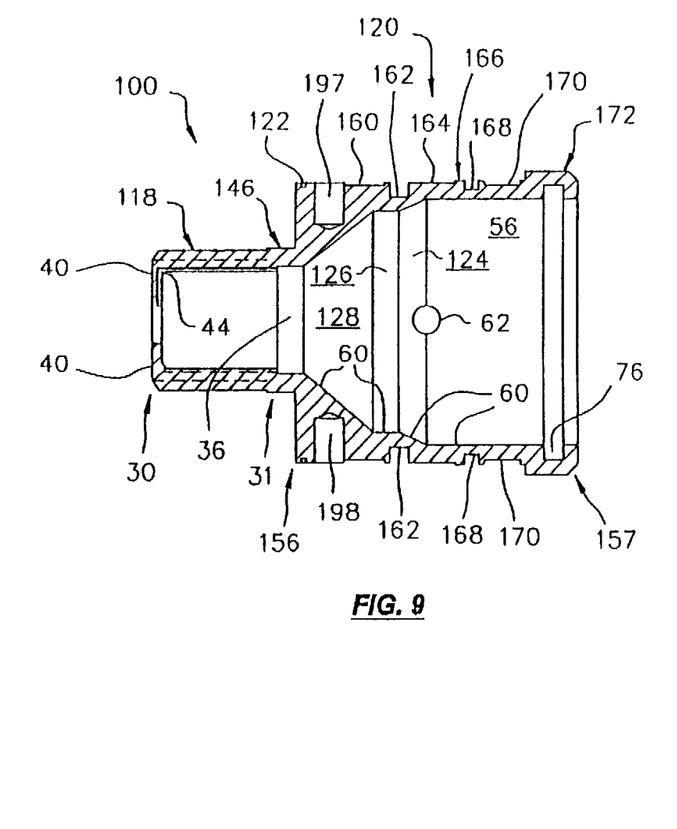
FIG. 9 is an isolated cross-sectional view of the cylinder adaptor of the alternate embodiment wherein the neck and body portions can be seen in detail illustrating the various parts in their relative positions to each other.
Figure 10:
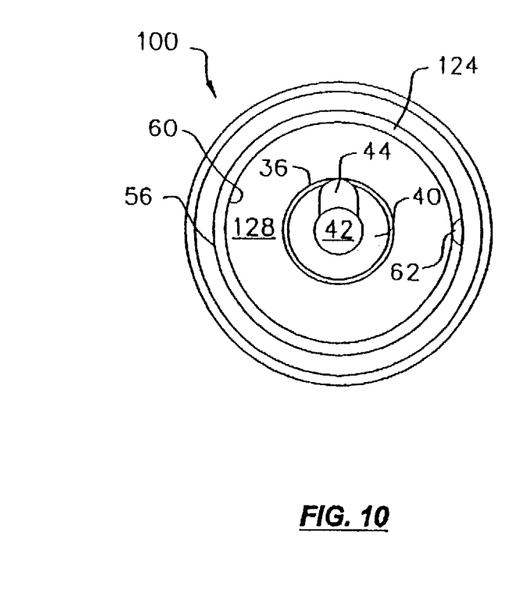
FIG. 10 is a side elevational view of the cylinder adaptor of the alternate embodiment showing the center bore, enlarged step bore, the gas flow channel, the center hole, the large bore section, the tapered center bore and the vent hole in their relative positions to each other.

In referring now to FIGS. 6, 9 and 10, the body portion 120 of the alternate embodiment can be better understood. The body portion 120 is similar to the body portion 20 in the first embodiment. However, the outside surface 54 is designed differently and, internally, the body portion 120 has two tapered bore sections. The body portion 120 has a large bore section 56 having a cylinder gasket groove 76 adjacent the second end 157 similar to the first embodiment. However, the large bore section 56 converges with a first tapered bore section 124. The first tapered bore section 124 progressively decreases in diameter from the large bore section 56 toward the first end 156. The first tapered bore section 124 then converges at its smallest diameter with a small bore section 126. The small bore section 126 continues toward the first end 156 whereupon it converges with a second tapered bore section 128. The second tapered bore section 128 progressively decreases in diameter from the small bore section 126 to the enlarged stepped bore 36 adjacent the first end 156.

The body portion 120, having a first end 156 and a second end 157, includes a first indicator channel 160 adjacent the first end 156. Positioned adjacent the first indicator channel 160, in progressing toward the second end 157, is positioned a large gasket notch 162. Continuing further on toward the second end 157 of the body portion 120, a pressure responsive chamber 164 is positioned adjacent the large gasket notch 162. The pressure responsive chamber 164 extends from the large gasket notch 162 toward the second end 157 until terminating at an elevated portion 166. The elevated portion 166 includes a small gasket notch 168 positioned therein. Adjacent the elevated portion 166, extending further toward the second end 157, is a second indicator channel 170 that terminates at a small end flange 172. The small end flange 172 extends radially outward from the body portion 120 adjacent the second end 157.

Similar to the first embodiment, the cylinder adaptor 100 also incorporates a vent hole 62 that extends through the body portion 120. For providing airtight seals on the outside surface 54 of the body portion 120, a large external gasket 174 is seated within the large gasket notch 162 and a small external gasket 176 is seated within the small gasket notch 168. To provide an airtight seal between the internal surfaces 60 of the large bore section 56 and the outer surface 15 of the cylinder 14, a large internal gasket 178 is seated within the cylinder gasket groove 76 adjacent the second end 157 of the body portion 120.

Figures 11, 12:
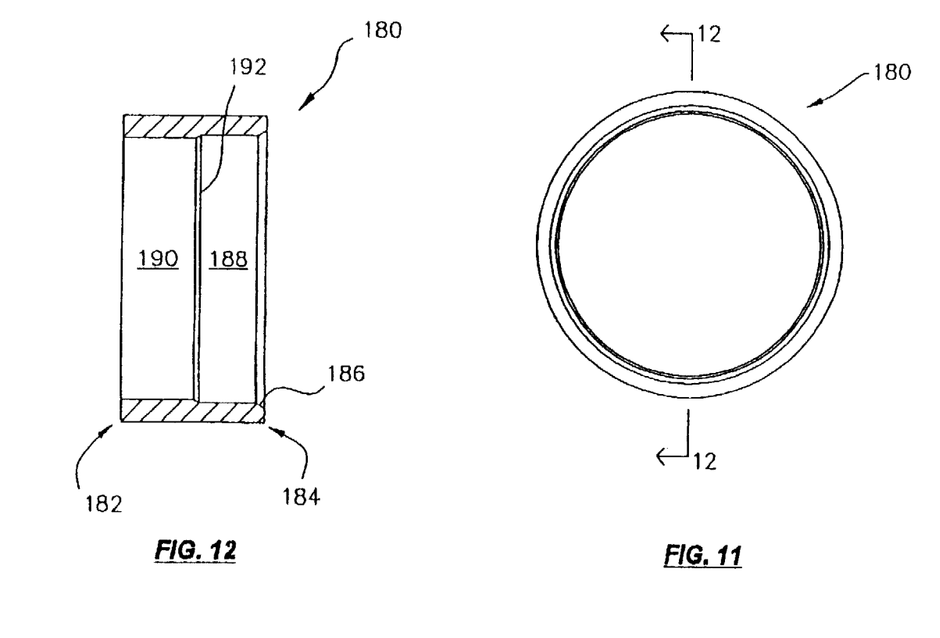
FIG. 11 is a side elevational view of the slide sleeve of the alternate embodiment showing the large center bore, the small center bore and the tapered center bore in their relative positions to each other.
FIG. 12 is a cross-sectional view of the slide sleeve taken along line 12—12 illustrating the large center bore, the small center bore and the tapered center bore in their relative positions.
Figure 13:
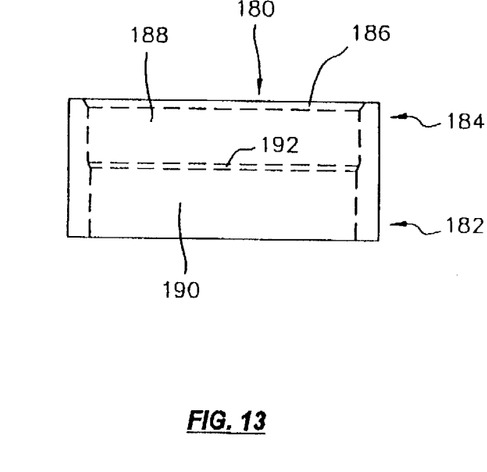
FIG. 13 is a top view of the slide sleeve illustrating the large center bore, the small center bore and the tapered center bore in their relative positions to each other.

In now referring to FIGS. 11, 12 and 13, a slide sleeve 180 can be seen in various views. The slide sleeve 180 has an engaging end 182 and an opposing end 184. The opposing end 184 incorporates a flared internal edge 186 to facilitate ease of assembly. The slide sleeve 180 is circular in shape and has a large center bore 188 that is sized to receive the cylinder adaptor 100 up to the elevated portion 166. The slide sleeve 180 further incorporates a small center bore 190 and a tapered center bore 192 that is interposed between the large center bore 188 and small center bore 190. The small center bore 190 is sized to receive the first end 156 of the body portion 120 up to the extent to the elevated portion 166. The tapered center bore 192 converges with the large center bore 188 and extends toward the first end 156 of the body portion 120 to converge with the small center bore 190. The tapered center bore 192, thus, has a decreasing diameter as it extends from the large center bore 188 to the small center bore 190 and forms an angled internal surface which cooperates with the upright elevated portion 166.

The slide sleeve 180 is positioned over the body portion 120 of the cylinder adaptor 100 such that the large external gasket 174 and the small external gasket 176 are slightly compressed when contacting the respective small and large center bores 190 and 188. When in place, the slide sleeve 180 serves to enclose and seal the pressure responsive chamber 164. Thus, the pressure responsive chamber 164 is defined by the outside surface 54 of the body portion 120, the large external gasket 174, the small external gasket 176 and the tapered center bore 192 of the slide sleeve 180.

On the body portion 120, adjacent the first end 156, a first ream 197 and a second ream 198 are positioned opposite each other in the first indicator channel 160. The first and second reams 197 and 198 extend into the body portion 120 and are sized to receive a first pin 199 and a second pin 200, respectively. The first and second pins 199 and 200 are fixedly received by the first and second reams 197 and 198 after the assembling of the slide sleeve 180 onto the body portion 120. The first and second reams 197 and 198 and the first and second pins 199 and 200 serve to cooperate with the slide sleeve 180 thereby providing a retaining means which serves to retain the slide sleeve 180 upon its movement caused by the cylinder 14 being discharged.

The first indicator channel 160 is preferably green in color to signify that the cylinder 14 is full and ready for use. The second indicator channel 170 is preferably red in color to signify that the cylinder 14 has been discharged and is no longer useable.

In now referring back to FIG. 6, the operation of the cylinder indicator 10 can be readily understood. Upon an activation of the inflating device 16, the cylinder 14 is punctured and the compressed gas is discharged through the center hole 42 whereby a secondary supply of gas is tapped-off by way of the gas flow channel 44 which directs the secondary supply of gas to flow into a region 201 defined by the internal surfaces 60 of the large, small, first and second tapered bore sections 56, 126, 124 and 128 respectively, the outer surface 15 of the cylinder 14 and the large internal gasket 178. From the region 201, the secondary supply of gas flows out the vent hole 62 whereupon the pressure responsive chamber 164 is pressurized and resultingly forced to expand.

Upon the pressure responsive chamber 164 being forced to expand, the slide sleeve 180 is forced to move along the longitudinal axis of the cylinder adaptor 100 toward the first end 156 such that the pressure responsive chamber 164 increases in volume. The slide sleeve 180, having initially been assembled such that its opposing end 184 covers the second indicator channel 170 and the engaging end 182 exposes the first indicator channel 160, thereby slides toward the first end 156 exposing the second indicator channel 170 to signify that the cylinder 14 has been discharged.

Figure 14:
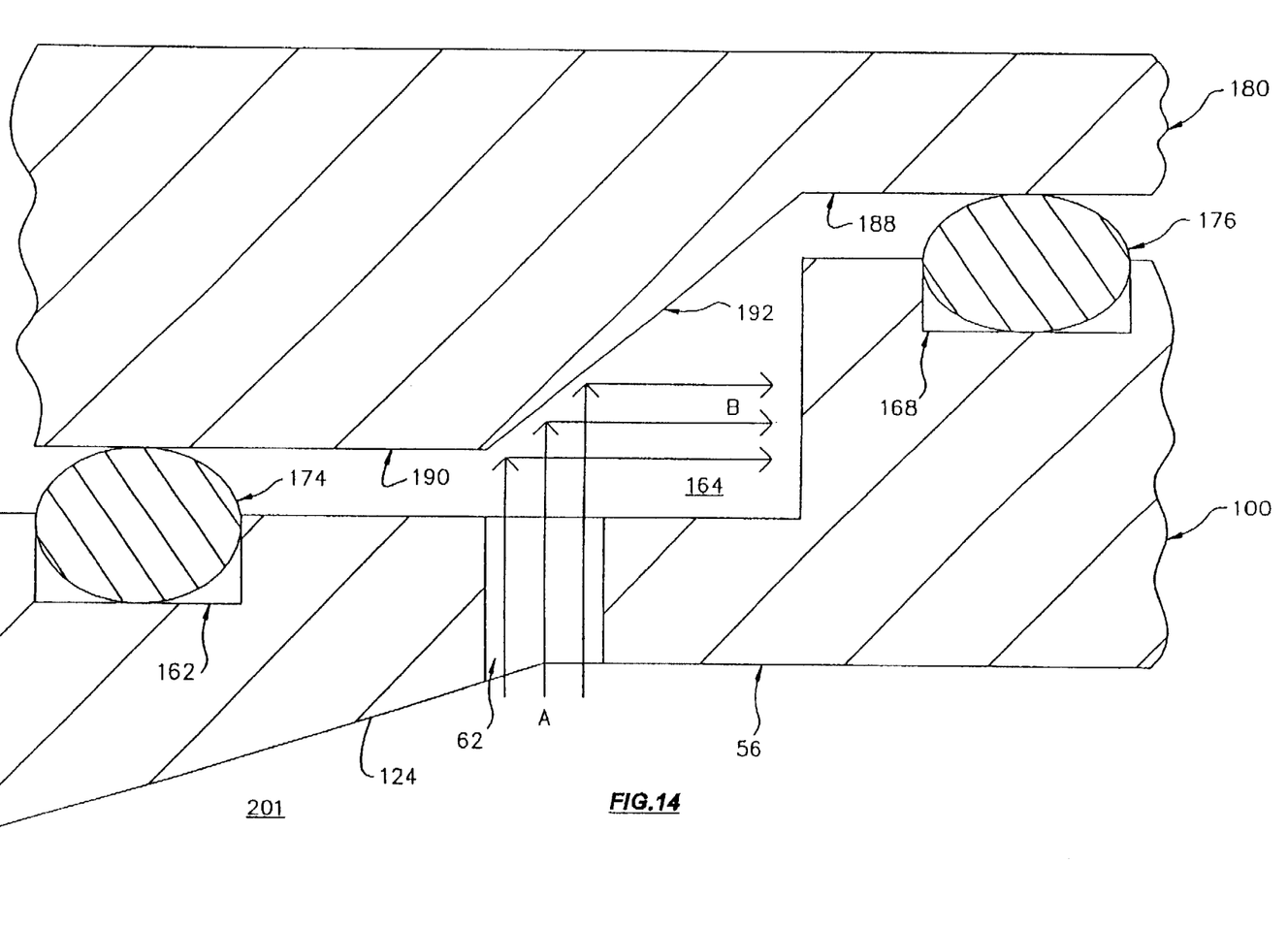
FIG. 14 is an enlarged cross-sectional view of the pressure responsive chamber in conjunction with the vent hole accessing the chamber, the tapered center bore of the slide sleeve, the large external gasket, the small external gasket and the respective gas flow into the pressure responsive chamber in their relative positions to each other and proper directions.

In now referring to FIG. 14, an enlarged cross-sectional view of the pressure responsive chamber 164 can be seen in its relative position to the small center bore 190, the large center bore 188 and the tapered center bore 192 of the slide sleeve 180. The vent hole 62 is shown to access the pressure responsive chamber 164 thereby providing fluid communication with the region 201. The large external gasket 174 and small external gasket 176 can also be seen in their compressed state due to contact with the slide sleeve 180. The directional arrows A and B illustrate the directional flow of the secondary supply of gas entering the pressure responsive chamber 164 via the vent hole 62.

In order to assure proper movement of the slide sleeve 180 due to an increase in pressure in the pressure responsive chamber 164, the large and small external gaskets 174 and 176 are preferably small O-rings. Thus, the disclosed preferably small O-rings would exhibit the correct amount of friction on the slide sleeve 180 so as to allow for the slide sleeve 180 to be properly displaced along the body portion 120 to expose the second indicator channel 170 and signify that the cylinder 14 has been discharged.

It is preferable that the cylinder adaptors 12 and 100 of each embodiment, the slide sleeve 180 and the first and second pins 199 and 200 are formed from brass or high strength plastic so to withstand the forces exerted by the compressed gas on discharge. Once the cylinder 14 has been discharged, the cylinder adaptor 100 and associated cylinder 14 are to be discarded and replaced with a new cylinder indicator system 10.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A cylinder indicator system for use with inflation devices that include a cylinder of compressed gas having a slim neck, a full body and an outer surface, said cylinder indicator system comprising in combination:

an adaptor means for receiving the cylinder and facilitating coupling the cylinder to the inflation device;

an indication means for indicating the respective status of the cylinder as being full or empty operatively associated with said adaptor means; and a gas flow means for providing a secondary supply of gas to said indication means, said gas flow means being associated with said adaptor means and in fluid communication with said indication means, whereby said indication means is responsive to a secondary flow of gas guided threat upon the discharging of the cylinder into the inflation device, wherein said adaptor means is a cylinder adaptor comprised of a neck portion having a distal end, a proximal end and a center bore, and a body portion having a first end, a second end, an outside surface, and a large bore section having an internal surface, said proximal end of said neck portion being associated with said first end of said body portion, whereby said center bore of said neck portion and said large bore section of said body portion are sized to receive the slim neck and full body of the cylinder respectively, wherein said gas flow means is comprised of a gas flow channel, a dye chamber, a valve means for allowing gas to flow from said gas flow channel to said dye chamber and concurrently preventing flow from said dye chamber to said gas flow channel, and a vent hole, whereby said vent hole extends through said body portion of said cylinder adaptor and said gas flow channel is integral with said neck portion and extends along the longitudinal axis of said neck portion.

2. The cylinder indicator system as recited in claim 1, wherein said center bore of said neck portion further includes internal threads, said internal threads facilitating releasably coupling said cylinder to said cylinder adaptor.

3. The cylinder indicator system as recited in claim 1, wherein said indication means is comprised of a dye fluid and an indicator chamber, said dye fluid being positioned in said dye chamber, said indicator chamber being positioned on and coupled to the outside surface of said body portion and in fluid communication with said dye chamber via said vent hole, whereby said dye fluid is forced out said vent hole into said indicator chamber upon the discharging of the cylinder due to said secondary supply of gas flowing through said gas flow channel and said valve means into said dye chamber.

4. The cylinder indicator system as recited in claim 3, wherein said vent hole includes a vent plug releasably coupled thereto, said vent plug thereby uncoupling upon a build up of pressure in said dye chamber.

5. The cylinder indicator system as recited in claim 3, wherein said body portion further includes an indicator sleeve coupled to said outside surface, a first sleeve gasket and a second sleeve gasket, said indicator sleeve thereby covering said indicator chamber and said first and second sleeve gaskets serving to seal said indicator chamber and said indicator sleeve so to contain said dye fluid upon the cylinder discharging.

6. The cylinder indicator system as recited in claim 5, wherein said indicator chamber further includes an indicator paper for interacting with said dye fluid.

7. The cylinder indicator system as recited in claim 5, wherein said indicator sleeve is formed from a transparent material to facilitate viewing the presence of said dye fluid in said dye chamber upon the cylinder discharging.

8. A cylinder indicator system for use with inflation devices that include a cylinder of compressed gas having a slim neck, a full body and an outer surface, said cylinder indicator system comprising in combination:

an adaptor means for receiving the cylinder and facilitating coupling the cylinder to the inflation device;

an indication means for indicating the respective status of the cylinder as being full or empty operatively associated with said adaptor means; and a gas flow means for providing a secondary supply of gas to said indication means said gas flow means being associated with said adaptor means and in fluid communication with said indication means whereby said indication means is responsive to a secondary flow of gas guided threat upon the discharging of the cylinder into the inflation device, wherein said adaptor means is a cylinder adaptor comprised of a neck portion having a distal end, a proximal end and a center bore, and a body portion having a first end, a second end, an outside surface, and a large bore section having an internal surface, said proximal end of said neck portion being associated with said first end of said body portion, whereby said center bore of said neck portion and said large bore section of said body portion are sized to receive the slim neck and full body of the cylinder respectively, wherein said body portion further includes a tapered bore section positioned between said large bore section and said first end of said body portion, said tapered bore section having an inside surface and a decreasing diameter progressing toward said first end.

9. The cylinder indicator system as recited in claim 8, wherein said body portion further includes a first cylinder gasket seated at said second end on said internal surface of said large bore section and a second cylinder gasket positioned on said inside surface of said tapered bore section, whereby said first cylinder gasket produces a seal around the full body of the cylinder and said second cylinder gasket produces a seal around the slim neck of the cylinder.

10. The cylinder indicator system as recited in claim 9, wherein said valve means is comprised of said second cylinder gasket, said inside surface of said tapered bore section and the outer surface of the cylinder, whereby said inside surface of said tapered bore section and the outer surface of the cylinder are separated by a distance that decreases from said large bore section to said first end such that said second cylinder gasket serves as a two-way valve allowing flow away from said first end during a discharge and towards said first end upon an over-pressurization.

11. The cylinder indicator system as recited in claim 9, wherein said dye chamber is defined as the region bounded by the outer surface of the cylinder, said internal surfaces of said large and tapered center bores, and said first and second cylinder gaskets.

12. The cylinder indicator system as recited in claim 8, wherein said tapered bore section further includes a slot positioned therein running along said tapered bore section to said neck portion so to facilitate the release of gas from said indication means upon an over pressurization thereof.

13. A cylinder indicator system for use with inflation devices that include a cylinder of compressed gas having a slim neck, a full body and an outer surface, said cylinder indicator system comprising in combination:

an adaptor means for receiving the cylinder and facilitating coupling the cylinder to the inflation device;

an indication means for indicating the respective status of the cylinder as being full or empty operatively associated with said adaptor means; and a gas flow means for providing a secondary supply of gas to said indication means, said gas flow means being associated with said adaptor means and in fluid communication with said indication means, whereby said indication means is responsive to a secondary flow of gas guided threat upon the discharging of the cylinder into the inflation device, wherein said adaptor means is a cylinder adaptor comprised of a neck portion having a distal end, a proximal end and a center bore, and a body portion having a first end, a second end, an outside surface, and a large bore section having an internal surface, said proximal end of said neck portion being associated with said first end of said body portion, whereby said center bore of said neck portion and said large bore section of said body portion are sized to receive the slim neck and full body of the cylinder respectively, wherein said indication means is comprised of a first indicator channel associated with said outside surface, a second indicator channel associated with said outside surface, a pressure responsive chamber associated with said outside surface therebetween and a slide sleeve associated with said outside surface enclosing said pressure responsive chamber, said slide sleeve having an engaging end and an opposing end, whereby said slide sleeve is initially positioned such that said opposing end covers said second indicator channel when the cylinder is full of compressed gas, and said engaging end subsequently covers said first indicator channel upon the cylinder being discharged which results in a build-up of pressure to occur in said pressure responsive chamber thereby causing an expansion thereof and forcing the slide sleeve to slide along the body portion toward said first end.

14. The cylinder indicator system as recited in claim 13, wherein said body portion further includes a large internal gasket seated on said internal surface of said large bore section adjacent said second end, and a retaining means coupled to said outside surface for retaining said slide sleeve on said body portion during a discharge of the cylinder, whereby said large internal gasket forms a seal between said internal surface of said large bore section and the outer surface of the cylinder.

15. The cylinder indicator system as recited in claim 14, wherein said retaining means is comprised of a first ream extending into said body portion adjacent said first end, a second ream spaced opposite said first ream extending into said body portion adjacent said first end, a first pin received by and coupled to said first ream and a second pin received by and coupled to said second ream, whereby said engaging end of said slide sleeve contacts said first and second pins thereby retaining said slide sleeve after a forced movement due to a discharge of the cylinder.

16. The cylinder indicator system as set forth in claim 13, wherein said first indicator channel is green in color and said second indicator channel is red in color.

17. The cylinder indicator system as recited in claim 13, wherein said pressure responsive chamber is sealed by a large external gasket and a small external gasket, whereby said pressure responsive chamber is airtight and susceptible to an increase in pressure so to thereby initiate movement in the slide sleeve.

18. The cylinder indicator system as recited in claim 17, wherein said body portion further includes an indicator shield coupled to said outside surface, said indicator shield being shaped to cooperate with and receive said body portion and said slide sleeve thereby providing protection from said slide sleeve upon forced movement during a discharge of the cylinder.

19. A cylinder indicator system for use with inflation devices that include a cylinder of compressed gas, said cylinder indicator system comprising:

an adaptor means for receiving the cylinder and facilitating coupling the cylinder to the inflation device;

an indication means for indicating the respective status of the cylinder as being full or empty operatively associated with said adaptor means; and a gas flow means for providing a secondary supply of gas to said indication means, said gas flow means being associated with said adaptor means and in fluid communication with said indication means, whereby said indication means is responsive to a secondary flow of gas guided threat upon the discharging of the cylinder into the inflation device, wherein said gas flow means is comprised of a gas flow channel, a dye chamber, a valve means for allowing gas to flow from said gas flow channel to said dye chamber and concurrently preventing flow from said dye chamber to said gas flow channel, and a vent hole.

20. A cylinder indicator system for use with inflation devices that include a cylinder of compressed gas, said cylinder indicator system comprising:

an adaptor means for receiving the cylinder and facilitating coupling the cylinder to the inflation device;

an indication means for indicating the respective status of the cylinder as being full or empty operatively associated with said adaptor means; and a gas flow means for providing a secondary supply of gas to said indication means, said gas flow means being associated with said adaptor means and in fluid communication with said indication means, whereby said indication means is responsive to a secondary flow of gas guided threat upon the discharging of the cylinder into the inflation device, wherein said indication means is comprised of a first indicator channel associated with said adapter means, a second indicator channel associated with said adapter means, a pressure responsive chamber associated with said adapter means therebetween and a slide sleeve associated with said adapter means enclosing said pressure responsive chamber, said slide sleeve having an engaging end and an opposing end, whereby said slide sleeve is initially positioned such that said opposing end covers said second indicator channel when the cylinder is full of compressed gas, and said engaging end subsequently covers said first indicator channel upon the cylinder being discharged which results in a build-up of pressure to occur in said pressure responsive chamber thereby causing an expansion thereof and forcing the slide sleeve to slide.

* * * * *

UNITED STATES PATENT AND TRADEMARK OFFICE
CERTIFICATE OF CORRECTION

PATENT NO. : 5,775,358
DATED : July 7, 1998
INVENTOR(S) : Lyman W. Fawcett, Jr. and Jacek M. Weinheimer It is certified that error appears in the above-indentified patent and that said Letters Patent is hereby corrected as shown below:

Column 2, Line 24 "should be merely" should be -- should be construed to merely --

Column 11, Line 2 "threat" should be -- thereat --

Signed and Sealed this

Ninth Day of March, 1999

Attest:

Attesting Officer

Q. TODD DICKINSON

Acting Commissioner of Patents and Trademarks